United States Patent
Tran et al.

(10) Patent No.: US 11,036,857 B2
(45) Date of Patent: Jun. 15, 2021

(54) PROTECTING A MACHINE LEARNING MODEL

(71) Applicant: International Business Machines Corporation, Armonk, NY (US)

(72) Inventors: Ngoc Minh Tran, Dublin (IE); Mathieu Sinn, Dublin (IE); Ambrish Rawat, Dublin (IE); Maria-Irina Nicolae, Dublin (IE); Martin Wistuba, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 16/192,787

(22) Filed: Nov. 15, 2018

(65) Prior Publication Data

US 2020/0159924 A1 May 21, 2020

(51) Int. Cl.
*G06F 21/55* (2013.01)
*G06F 21/56* (2013.01)
(Continued)

(52) U.S. Cl.
CPC .......... *G06F 21/566* (2013.01); *G06F 21/554* (2013.01); *G06N 3/088* (2013.01);
(Continued)

(58) Field of Classification Search
CPC ............... G06F 21/566; G06F 21/554; G06F 2221/033; G06F 21/55; G06F 21/56;
(Continued)

(56) References Cited

U.S. PATENT DOCUMENTS 9,710,653 B2 7/2017 Kotler et al.
10,542,034 B1 * 1/2020 Shintre .................... G06N 3/08
(Continued)

OTHER PUBLICATIONS

Athalye et al., "Obfuscated Gradients Give a False Sense of Security: Circumventing Defenses to Adversarial Examples", Jul. 31, 2018, 12 pages, https://arxiv.org/pdf/1802.00420v4.pdf.
(Continued)

*Primary Examiner* — Jayesh M Jhaveri
(74) *Attorney, Agent, or Firm* — Kurt Goudy; Otterstedt, Wallace & Kammer, LLP

(57) ABSTRACT

A method for protecting a machine learning model includes: generating a first adversarial example by modifying an original input using an attack tactic, wherein the model accurately classifies the original input but does not accurately classify at least the first adversarial example; training a defender to protect the model from the first adversarial example by updating a strategy of the defender based on predictive results from classifying the first adversarial example; updating the attack tactic based on the predictive results from classifying the first adversarial example; generating a second adversarial example by modifying the original input using the updated attack tactic, wherein the trained defender does not protect the model from the second adversarial example; and training the defender to protect the model from the second adversarial example by updating the at least one strategy of the defender based on results obtained from classifying the second adversarial example.

20 Claims, 5 Drawing Sheets

(51) Int. Cl.
   *H04L 29/06* (2006.01)
   *G06N 3/08* (2006.01)
   *G06F 30/27* (2020.01)
(52) U.S. Cl.
   CPC ............ *G06F 21/556* (2013.01); *G06F 30/27* (2020.01); *G06F 2221/033* (2013.01); *H04L 29/06911* (2013.01)
(58) Field of Classification Search
   CPC ....... G06F 21/556; G06F 30/27; G06N 3/088; G06N 3/08; H04L 29/06; H04L 29/06911
   See application file for complete search history.

(56) References Cited

U.S. PATENT DOCUMENTS

| | | | | |
|---|---|---|---|---|
| 10,861,439 | B2* | 12/2020 | Doyle | G06F 40/284 |
| 2016/0044057 | A1 | 2/2016 | Chenette et al. | |
| 2016/0371490 | A1 | 12/2016 | Shakarian et al. | |
| 2019/0188562 | A1* | 6/2019 | Edwards | G06N 3/04 |
| 2020/0089899 | A1* | 3/2020 | Jami | G06N 3/08 |
| 2020/0134391 | A1* | 4/2020 | Assaderaghi | G06N 20/00 |
| 2020/0167471 | A1* | 5/2020 | Rouhani | G06N 3/0454 |

OTHER PUBLICATIONS

Buckman et al., "Thermometer Encoding: One Hot Way to Resist Adversarial Examples", International Conference on Learning Representations (ICLR), Apr. 2018, 22 pages, https://openreview.net/pdf?id=S18Su--CW.
Cao et al., "Mitigating Evasion Attacks to Deep Neural Networks via Region-based Classification", Jan. 11, 2018, 17 pages, https://arxiv.org/pdf/1709.05583v3.pdf.
Cisse et al., "Parseval Networks: Improving Robustness to Adversarial Examples", May 2, 2017, 10 pages, https://arxiv.org/pdf/1704.08847v2.pdf.
Dhillon et al., "Stochastic Activation Pruning for Robust Adversarial Defense", International Conference on Learning Representations (ICLR), Apr. 2018, 13 pages, https://openreview.net/pdf?id=H1uR4GZRZ.
Fawzi et al., "Classification regions of deep neural networks", May 26, 2017, 8 pages, https://arxiv.org/pdf/1705.09552v1.pdf.
Feinman et al., "Detecting Adversarial Samples from Artifacts", Nov. 15, 2017, 9 pages, https://arxiv.org/pdf/1703.00410v3.pdf.
Gilmer et al., "Adversarial Spheres", International Conference on Learning Representations (ICLR), Apr. 2018, 13 pages, https://openreview.net/pdf?id=SkthILkPf.
Gong et al., "Adversarial and Clean Data Are Not Twins", Apr. 17, 2017, 7 pages, https://arxiv.org/pdf/1704.04960v1.pdf.
Goodfellow et al., "Explaining and Harnessing Adversarial Examples", International Conference on Learning Representations (ICLR), Mar. 20, 2015, 11 pages, https://arxiv.org/pdf/1412.6572v3.pdf.
Grosse et al., "On the (Statistical) Detection of Adversarial Examples", Oct. 17, 2017, 13 pages, https://arxiv.org/pdf/1702.06280v2.pdf.
Gu et al., "Towards Deep Neural Network Architectures Robust to Adversarial Examples", International Conference on Learning Representations (ICLR), Apr. 9, 2015, 9 pages, https://arxiv.org/pdf/1412.5068v4.pdf.
Guo et al., "Countering Adversarial Images using Input Transformations", International Conference on Learning Representations (ICLR), Apr. 2018, 12 pages, https://openreview.net/pdf?id=S18Su--CW.
Hendrycks et al., "Early Methods for Detecting Adversarial Images", International Conference on Learning Representations (ICLR), Mar. 23, 2017, 9 pages, https://arxiv.org/pdf/1608.00530v2.pdf.
Hosseini et al., "Blocking Transferability of Adversarial Examples in Black-Box Learning Systems", Mar. 13, 2017, 11 pages, https://arxiv.org/pdf/1703.04318v1.pdf.

Ilyas et al., "The Robust Manifold Defense: Adversarial Training using Generative Models", Dec. 26, 2017, 25 pages, https://arxiv.org/pdf/1712.09196v1.pdf.
Li et al., "Adversarial Examples Detection in Deep Networks with Convolutional Filter Statistics", Oct. 26, 2017, 12 pages, https://arxiv.org/pdf/1612.07767v2.pdf.
Ma et al., "Characterizing Adversarial Subspaces Using Local Intrinsic Dimensionality", International Conference on Learning Representations (ICLR), Apr. 2018, 15 pages, https://openreview.net/pdf?id=B1gJ1L2aW.
Madry et al., "Towards Deep Learning Models Resistant to Adversarial Attacks", Nov. 9, 2017, 27 pages, https://arxiv.org/pdf/1706.06083v3.pdf.
Meng et al., "MagNet: A Two-Pronged Defense against Adversarial Examples", Proceedings of the 2017 ACM SIGSAC Conference on Computer and Communications Security (CCS), Oct. 2017, p. 135-147, https://dl.acm.org/citation.cfm?id=3134057.
Metzen et al., "On Detecting Adversarial Perturbations", International Conference on Learning Representations (ICLR), Apr. 2017, 12 pages, https://openreview.net/pdf?id=SJzCSf9xg.
Miyato et al., "Virtual Adversarial Training: A Regularization Method for Supervised and Semi-Supervised Learning", Jun. 27, 2018, 16 pages, https://arxiv.org/pdf/1704.03976v2.pdf.
Bhagoji et al., "Enhancing Robustness of Machine Learning Systems via Data Transformations", Nov. 29, 2017, 15 pages, https://arxiv.org/pdf/1704.02654v4.pdf.
Papernot et al., "Distillation as a Defense to Adversarial Perturbations against Deep Neural Networks", 2016 IEEE Symposium on Security and Privacy (SP), May 2016, 16 pages, https://ieeexplore.ieee.org/document/7546524/.
Samangouei et al., "Defense-GAN: Protecting Classifiers Against Adversarial Attacks Using Generative Models", International Conference on Learning Representations (ICLR), Apr. 2018, 17 pages, https://openreview.net/pdf?id=BkJ3ibb0-.
Song et al., "PixelDefend: Leveraging Generative Models to Understand and Defend against Adversarial Examples", International Conference on Learning Representations (ICLR), Apr. 2018, 20 pages, https://openreview.net/pdf?id=rJUYGxbCW.
Warde-Farley et al., "Adversarial Perturbations of Deep Neural Networks", Ch. 11, p. 311-342, in Perturbations, Optimization, and Statistics, MIT Press, Dec. 2016 https://books.google.com/books?hl=en&lr=8&id=F4c3DwAAQBAJ&pg=PA311.
Weng et al., "Evaluating the Robustness of Neural Networks: An Extreme Value Theory Approach", International Conference on Learning Representations (ICLR), Apr. 2018, 18 pages, https://openreview.net/pdf?id=BkUHIMZ0b.
Xie et al., "Mitigating adversarial effects through randomizations", International Conference on Learning Representations (ICLR), Apr. 2018, 16 pages, https://openreview.net/pdf?id=Sk9yuql0Z.
Xu et al., "Feature Squeezing: Detecting Adversarial Examples in Deep Neural Networks", Network and Distributed Systems Security Symposium (NDSS), Feb. 2018, 15 pages, http://wp.internetsociety.org/ndss/wp-content/uploads/sites/25/2018/02/ndss2018_03A-4_Xu_paper.pdf.
Zantedeschi et al., "Efficient Defenses Against Adversarial Attacks", Proceedings of the 10th ACM Workshop on Artificial Intelligence and Security (AISec), Nov. 2017, p. 39-49, https://dl.acm.org/citation.cfm?id=3140449.
Szegedy et al., "Intriguing properties of neural networks", Feb. 19, 2014, 10 pages, https://arxiv.org/pdf/1312.6199v4.pdf.
Akhtar et al., "Threat of Adversarial Attacks on Deep Learning in Computer Vision: A Survey", IEEE Access, v. 6, p. 14410-14430, Mar. 2018, https://ieeexplore.ieee.org/document/8294186/.
Boshmaf et al., "Key Challenges in Defending Against Malicious Socialbots", 5th USENIX Workshop on Large-Scale Exploits and Emergent Threats (LEET), Apr. 24, 2012, 4 pages, https://www.usenix.org/system/files/conference/leet12/leet12-final10.pdf.
Clancy et al., "Security in Cognitive Radio Networks: Threats and Mitigation", 3rd International Conference on Cognitive Radio Oriented Wireless Networks and Communications (CrownCom), May 2018, 8 pages https://ieeexplore.ieee.org/document/4562534/.

(56) References Cited

OTHER PUBLICATIONS

Applegate et al., "An architecture for adversarial planning", IEEE Transactions on Systems, Man, and Cybernetics v. 20, n. 1, Jan./Feb. 1990, p. 186-194, https://ieeexplore.ieee.org/document/47820/.

Laskov et al., "Machine learning in adversarial environments", Machine Leaning, v. 81, n. 2, Nov. 2010, p. 115-119.

Sailer et al., "Adversarial Planning Through Strategy Simulation", 2007 IEEE Symposium on Computational Intelligence and Games (CIG), Apr. 2007, p. 80-87, https://ieeexplore.ieee.org/document/4219027/.

Bhattacharjee et al., "IBM deep learning service", IBM Journal of Research and Development, v. 61, n. 4/5, Jul.-Sep. 2017, p. 10:1-10:11, https://ieeexplore.ieee.org/document/8030274/.

Boag et al., "Scalable Multi-Framework Multi-Tenant Lifecycle Management of Deep Leaning Training Jobs", 31st Conference on Neural Information Processing Systems (NIPS), Dec. 8, 2017, 8 pages, http://learningsys.org/nips17/assets/papers/paper_29.pdf.

Singh et al., "Democratize AI with Fabric for Deep Learning (FfDL)", Mar. 20, 2018, 5 pages, https://developer.ibm.com/code/2018/03/20/democratize-ai-with-fabric-for-deep-learning.

IBM Corp., "Deep Learning: FAQ", 2018, 5 pages, https://www.ibm.com/cloud/deep-learning/faq.

Singh et al., "Integration of adversarial attacks in training pipeline", Jun. 19, 2018, 4 pages, https://github.com/IBM/integration-of-adversarial-attacks-in-training-pipeline.

Nicolae et al., "The Adversarial Robustness Toolbox—securing AI against adversarial threats", Apr. 17, 2018, 3 pages, https://phys.org/pdf443179489.pdf.

Nicolae et al., "Adversarial Robustness Toolbox v0.3.0", Aug. 8, 2018, 33 pages, https://arxiv.org/pdf/1807.01069v2.pdf.

\* cited by examiner

PROTECTING A MACHINE LEARNING MODEL

BACKGROUND

The present invention relates to the electrical, electronic and computer arts, and, more particularly, to improvements in security for machine learning applications.

Artificial intelligence (AI) using deep neural networks (e.g., deep learning) performs a wide variety of tasks with remarkable accuracies, including image classification and recognition, autoencoders, recurrent neural networks, deep reinforcement learning, etc. AI has provided major breakthroughs for challenging problems in fields such as natural language processing (e.g., understanding, classification and/or translation) and image processing, as well as security applications such as malware classification and facial recognition. However, recent research has revealed that deep neural networks may, in some circumstances, be susceptible to adversarial attacks in which inputs are maliciously modified in a manner which may be quasi-imperceptible to humans but which can fool a classifier into reporting an incorrect prediction output with high confidence. Adversarial attacks—such as cellphone camera attack, road sign attack, and robotic vision attack—may possibly be feasible in the real world. See, e.g., Szegedy et al., "Intriguing properties of neural networks", Feb. 19, 2014, 10 pages, and Akhtar et al., "Threat of Adversarial Attacks on Deep Learning in Computer Vision: A Survey", IEEE Access, v. 6, p. 14410-14430, March 2018.

SUMMARY

An illustrative embodiment includes a method for protecting a machine learning model. The method includes generating a first adversarial example by modifying an original input in accordance with an attack tactic, wherein the machine learning model accurately classifies the original input but does not accurately classify at least the first adversarial example. The method also includes training a defender to protect the machine learning model from the first adversarial example at least in part by updating at least one strategy of the defender based on predictive results from the machine learning model classifying the first adversarial example. The method further includes updating the attack tactic based on the predictive results obtained from the machine learning model classifying the first adversarial example. The method also includes generating a second adversarial example by modifying the original input in accordance with the updated attack tactic, wherein the trained defender does not protect the machine learning model from the second adversarial example. The method further includes training the defender to protect the machine learning model from the second adversarial example at least in part by updating the at least one strategy of the defender based on predictive results obtained from the machine learning model classifying the second adversarial example.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

DETAILED DESCRIPTION

Figure 1:
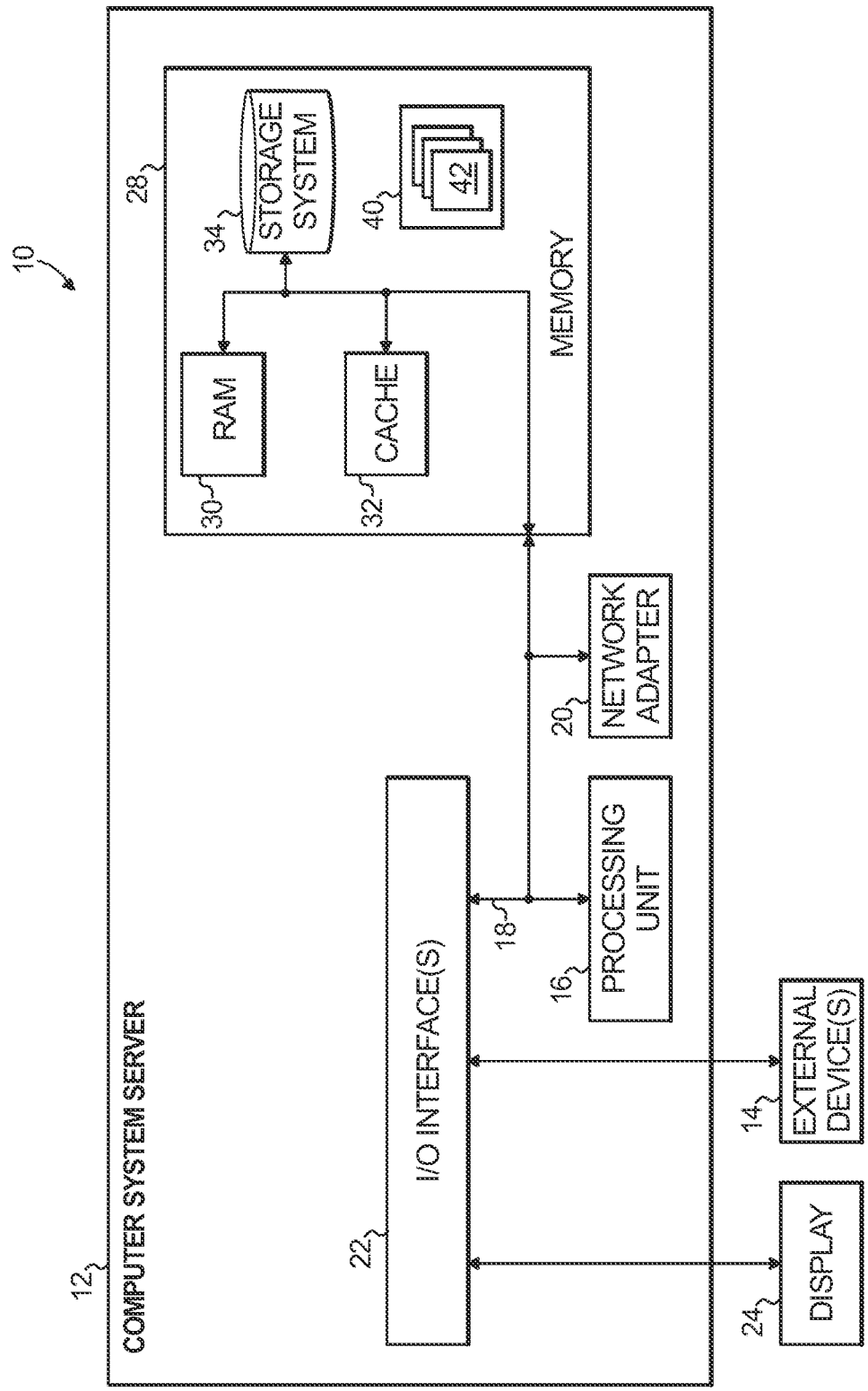
FIG. 1 depicts a cloud computing node according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
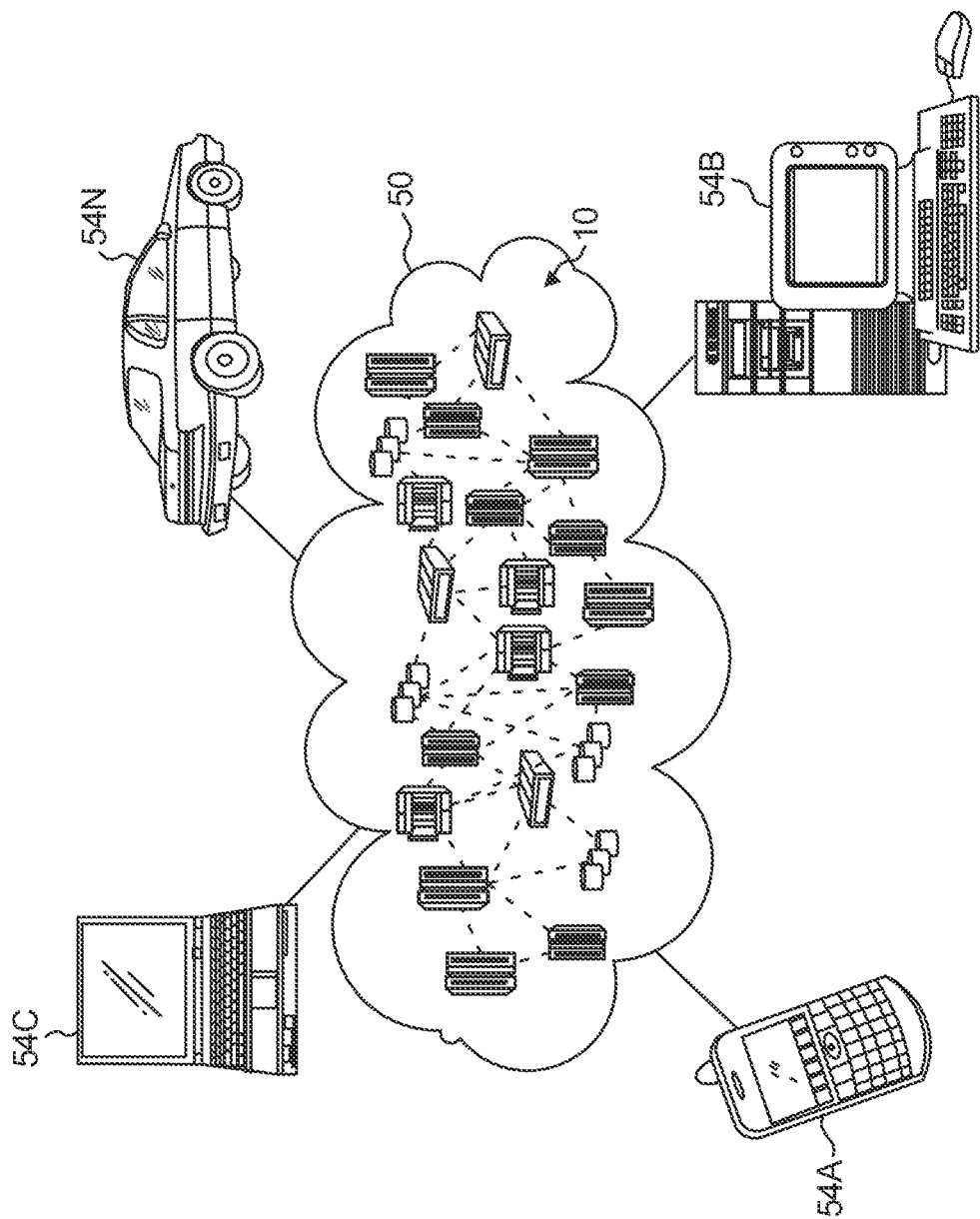
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
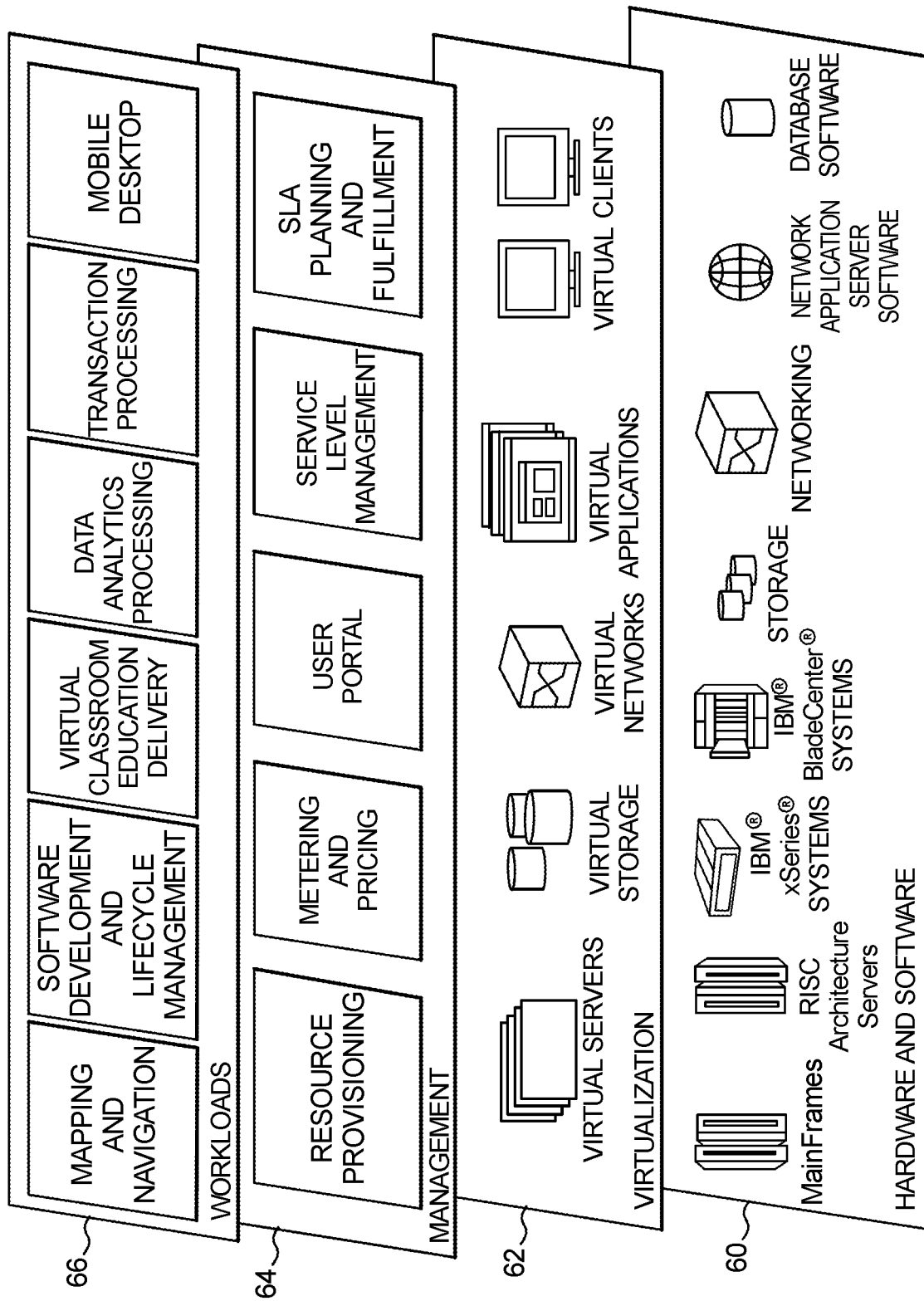
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

IBM® has recently introduced Deep Learning as a Service (DLaaS) which allows users to choose from a set of supported deep learning frameworks, neural network models, training data, and cost constraints. The job is scheduled and executed on a pool of heterogeneous infrastructure, including graphical processing units (GPUs) and central processing units (CPUs). A simple interface shields users from the complexity of the infrastructure and the advanced mechanics of scaling through distribution. Users can observe the progress of their training job and terminate it or modify its parameters based on how much it is progressing. When it is finished, the trained model is ready to be deployed in the cloud to classify new data. See, e.g., Bhattacharjee et al., "IBM Deep Learning Service", IBM Journal of Research and Development, v. 61, n. 4/5, July-September 2017, p. 10:1-10:11.

Commercially available offerings from IBM which implement DLaaS include Fiber for Deep Learning (FfDL) and Watson Machine Learning (WML). See, e.g., Boag et al., "Scalable Multi-Framework Multi-Tenant Lifecycle Management of Deep Leaning Training Jobs", 31st Conference on Neural Information Processing Systems (NIPS), Dec. 8, 2017, 8 pages, the disclosure of which is hereby incorporated by reference herein. As would be understood by one skilled in the art, embodiments of the present invention are advantageously integrable into an AI system, such as IBM's DLaaS, FfDL, and/or WML. See, e.g., Singh et al., "Integration of Adversarial Attacks in Training Pipeline", IBM GitHub, Jun. 18, 2018, 5 pages.

Illustrative embodiments of the present invention may implement a variety of defense strategies, which can be updated in real time. These defense strategies may, for example, detect an adversarial example and/or clean an adversarial example to recover its original version. Illustrative embodiments of the present invention can also emulate and improve different attack tactics. Thus, illustrative embodiments may provide a framework to allow learning optimal attack and defense strategies, so as to produce a fully protected AI model with an efficient defender and also an efficient attacker. Examples of attack and defense strategies suitable for use with embodiments of the present invention include those described in, e.g., Nicolae et al., "Adversarial Robustness Toolbox v0.3.0", Aug. 8, 2018, 33 pages, as well as the aforementioned paper by Akhtar et al. Indeed, one or more embodiments advantageously protect production AI models from potential adversarial attacks, thereby allowing models to robustly serve user requests with correct responses.

Embodiments of the present invention are advantageously integrable into an AI system to enhance the robustness of the system and provide users with more reliable and secure AI services. Embodiments of the present invention provide a comprehensive defense against adversarial evasion attacks against a machine learning model-based classifier. Unlike present solutions, embodiments of the present invention can advantageously provide defenses that anticipate dynamic tactical attacks.

Figure 4:
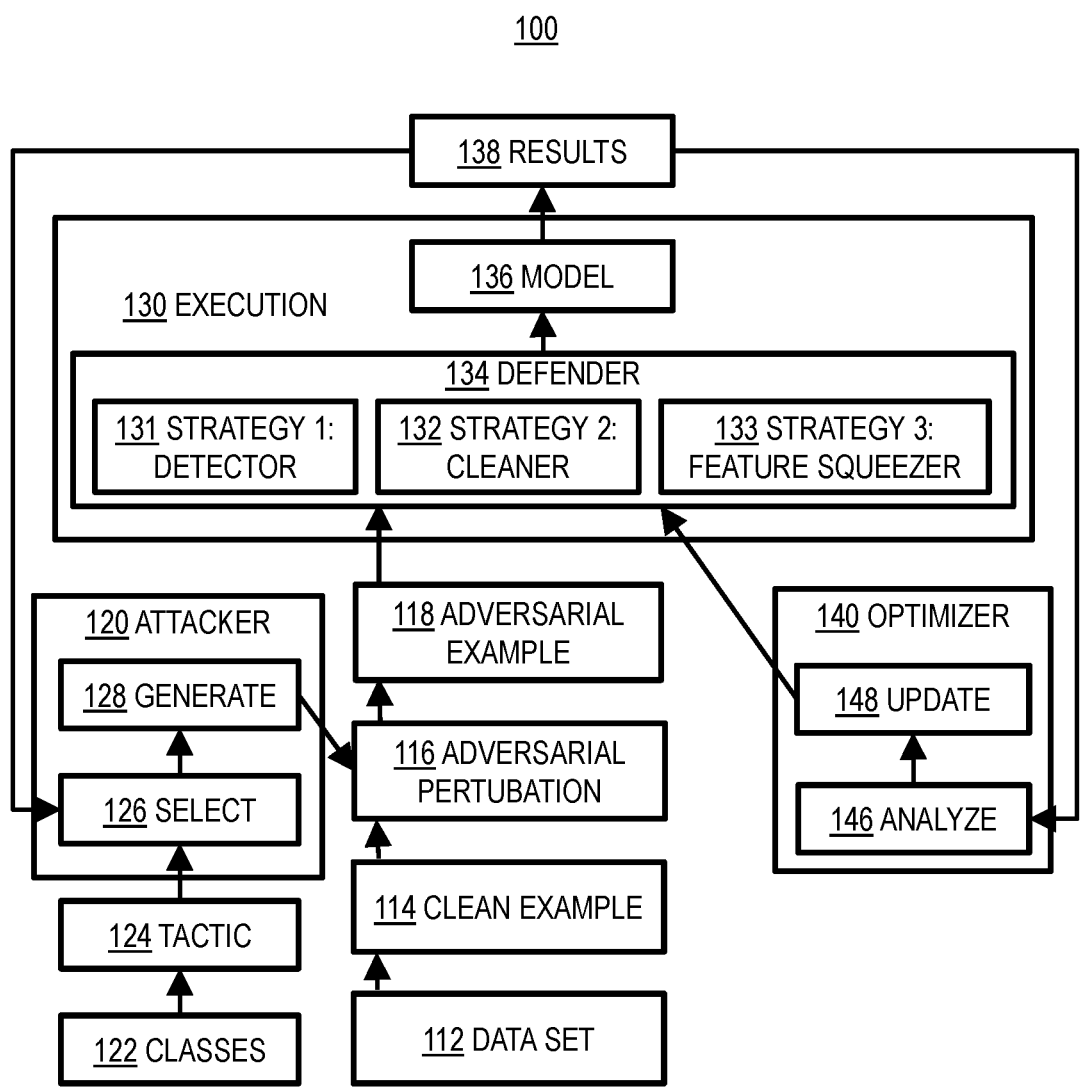
FIG. 4 is a combined block/flow diagram depicting aspects of an illustrative embodiment of the invention.

FIG. 4 is a combined block/flow diagram depicting aspects of an illustrative embodiment 100 of the invention, including computer system(s) and method(s) for defending AI models from adversarial attacks. An illustrative embodiment may receive data set 112 as input (e.g., provided by a user), as well as a model to be defended 136 (e.g., specified by the user). Model 136 may be any type of AI model such as an image classifier, auto-encoder, text processor, etc. Data set 112 may include unstructured data such as images, texts, and/or time series, and/or data set 112 may include structured data such as vectors and/or arrays. Clean example 114, which may be a single image, text, time series, vector, and/or array, is extracted from data set 112. In an illustrative embodiment, model 136 is capable of classifying and/or processing clean example 114 with a high degree of accuracy. However, by applying adversarial perturbation 116 (e.g., adding noise) to clean example 114, adversarial example 118 is formed. Adversarial example 118 is a version of clean example 114 which has been modified (e.g., by adversarial perturbation 116) in a manner which may be quasi-imperceptible to humans but which can fool model 136 into reporting an incorrect prediction output with high confidence.

Attacker module 120 may receive as initial input (e.g., provided and/or specified by the user) one or more classes of attacks 122 and a tactic of attacks 124. Each class of attacks 122 represents one way of generating adversarial perturbations 116 to form adversarial examples 118 from clean examples 114. Exemplary classes of adversarial attacks suitable for use with an embodiment of the present invention include, but are not limited to, those discussed in the aforementioned papers by Nicolae et al. and by Akhtar et al. Different classes of attacks will have different levels of danger and will be suitable for attacking different AI models 136. Also, for a given image, different classes of attacks may require different amounts of processing power and/or time, which could also influence the selection of an appropriate class of attack 122.

A tactic of attacks 124 indicates which class of attacks 122 to use and which component of the system to attack, flexibly depending on the knowledge it has about the system. Some embodiments may use black-box attacks which generate adversarial examples 118 without knowledge of the target model 136, while other embodiments may use semi-black box and/or white-box attacks which assume at least some knowledge of the target model 136. An adversarial attack may include feeding a targeted model 136 with adversarial examples 118 during testing.

Attacker module 120 includes a tactic selection submodule 126 and an attack generation submodule 128. Within attacker module 120, tactic selection submodule 126 selects a plan for attack the model 136, for example, determining which module to attack next within the system being defended by defender 134. In some embodiments, a tactic 124 may combine one or more attacks to fool model 136 with one or more attacks to fool defender 134 itself: such a tactic could be useful where a first attack targeting model 136 would otherwise be stopped by defender 134, and hence it is helpful to include a second attack targeting the defender 134 such that the first attack can successfully bypass the defender 134 in order to fool the model 136. Tactic selection submodule 126 may be provided with initial input including one or more attack classes 122 and tactic 124. Tactic selection submodule 126 may also update tactic 124 after receiving results 138 from prior attacks (e.g., adversarial example 118). Attack generation submodule 128 is responsible for using the class of attacks 122 to attack the module indicated by the tactic 124 selected by tactic selection submodule 126, for example, by generating adversarial perturbations 116 to execute an attack class 122 on a module indicated by tactic 124.

Execution module 130 includes model 136 and defender 134. As previously discussed, model 136 may be any type of AI model such as an image classifier, auto-encoder, text processor, etc. For example, model 136 may predict outcomes based on an input (e.g., examples 114 and/or 118). In an illustrative embodiment, model 136 is capable of classifying and/or processing clean example 114 with a high degree of accuracy, but adversarial example 118 can fool model 136 into reporting an incorrect prediction output with high confidence. Hence, rather than allowing model 136 to process adversarial example 118, adversarial example 118 is processed by defender 134 before reaching model 136, so that defender 134 can protect model 136 from the adversarial example 118.

Defender 134 may comprise a plurality of subcomponents 131, 132, 133, each of which implements a respective strategy to protect the model 136 from being attacked by adversarial example 118. In the illustrative embodiment 100 shown in FIG. 4, defender 134 includes three subcomponents: detector 131, cleaner 132, and feature squeezer 133. However, these subcomponents are purely exemplary, and defender 134 may include any number of subcomponents which may implement any combination of strategies. Exemplary adversarial defense strategies suitable for use with an embodiment of the present invention include, but are not limited to, those discussed in the aforementioned papers by Nicolae et al. and by Akhtar et al.

The subcomponents may or may not collaborate (e.g., the subcomponents may process the adversarial example 118 in series or in parallel). For example, subcomponent 131 may implement a detector which detects that example 118 is adversarial, while subcomponent 132 may implement a cleaner (and/or rectifier) which modifies the adversarial example 118 to restore the prediction of the targeted model 134 to its prediction on the clean version of the same example 114. Detector 131 and cleaner 132 may cooperate (e.g., operate in series and/or sequentially) such that an input (e.g., adversarial example 118) may be detected by detector 131 and then cleaned by cleaner 132.

Meanwhile, feature squeezer 133 may work as an independent sub-defender (e.g., operate in parallel and/or substantially simultaneously) to detector 131 and cleaner 132. For example, feature squeezer subcomponent 133 may implement a defense strategy that reduces the degrees of freedom available to an adversary (e.g., attacker 120) by squeezing out unnecessary input features (e.g., by rounding to the nearest integer value). For example, a clean example 114 with a value of 0.95 can be squeezed out (e.g., rounded) to a value of 1 so that if x is attacked by adding a noise 116 with a value of 0.02, then the resulting adversarial example 118 with a value 0.97 is still squeezed out (e.g., rounded) to x=1, and therefore does not change the output of the model 136. See, e.g., Xu et al., "Feature Squeezing: Detecting Adversarial Examples in Deep Neural Networks", Network and Distributed Systems Security Symposium (NDSS), February 2018, 15 pages.

Adversarial example 118, after passing through defender 134, is processed by model 136. Model 136 may predict an outcome and/or determine a classification for adversarial example 118, thereby generating real time results (e.g., predictive results and/or classifier results) 138. Results 138 may be used by tactic selector 126 within attacker 120 in real time to improve the efficiency of the tactic 124 and hence of the attack class 122. For example, tactic selection submodule 126 may use real time results 138 to adjust the attacks to counter the defense mechanisms implemented by defender 134, thereby moving from black-box attacks to semi-black box and/or white-box attacks as discussed above.

Attacker module 120 may be thought of as adversary, i.e., an agent who creates adversarial examples 118. Attacker 120 aims to change the manner in which model 136 classifies the input (e.g., change its target class). Thus, the attacker 120 seeks to generate adversarial examples 118 which will both bypass the defender 134 and fool the model 136.

Optimizer module 140 includes results analyzer submodule 146 and defense update submodule 148. Results analyzer submodule 146 performs real-time analysis of results 138 received from model 136 to evaluate and improve the performance of defense strategies 131, 132, 133. Defense update submodule 148 implements the improved strategies within the corresponding subcomponents 131, 132, 133 within defender 134.

Figure 5:
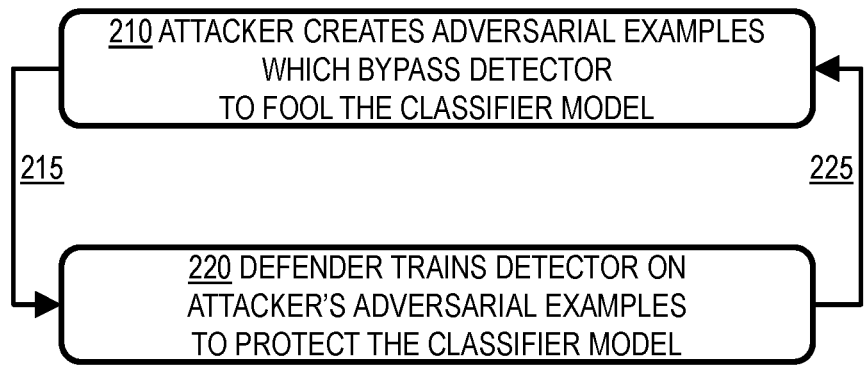
FIG. 5 is a flow diagram depicting aspects of an illustrative embodiment of the invention.

FIG. 5 is a flow diagram depicting aspects of an illustrative embodiment of the invention, including a method 200 for defending AI models from adversarial attacks. For the sake of simplicity, method 200 assumes that defender 134 includes only a single strategy (detector 131). However, as discussed above with reference to FIG. 1, defender 134 may implement any number and type of strategies.

Method 200 begins in step 210 where the attacker 120 creates adversarial examples 118 designed to bypass detector 131 and to fool the classifier model 136. After step 210, method 200 transitions via 215 to step 220, in which defender 134 and/or optimizer 140 updates (e.g., trains) detector 131 (e.g., using results 138) so as to recognize the adversarial examples 118 created by attacker 120 in step 210, such that model 136 is protected by detector 131 from these adversarial examples. After step 220, method 200 returns via 225 to step 210, in which attacker 120 creates new adversarial examples 118 to bypass the detector 131 as updated in step 220 and thus continue to fool the classifier model 136. After repeating step 210, method 200 proceeds via 215 to repeat step 220, in which defender 134 and/or optimizer 140 updates (e.g., trains) detector 131 (e.g., using results 138) so as to recognize the new adversarial examples 118 created by attacker 120 in the most recent invocation of step 210. Method 200 then proceeds via 215 to repeat step 210 in which attacker 120 creates new adversarial examples 118 to bypass the detector 131 as updated in the most recent invocation of step 220.

The steps of method 200 in FIG. 5 are repeated until an equilibrium between attacker 120 and defender 134 is reached, at which point the defense is optimal in the sense that it anticipates any further strengthening of the attack by applying the attackers' tactic. Thus, embodiments of the present invention cam advantageously provide defenses that anticipate dynamic tactical attacks. An illustrative embodiment includes an optimization process which constructs an optimal defense within a zero-sum game-theoretical loop where the optimal defense takes into account the next optimal action that an attacker would undertake, and where attackers can adjust their attack tactics to bypass the defense mechanism in place. In an illustrative embodiment, attacker 120 emulates adversarial attacks using a specified and/or selected tactic 124 and class 122 of attacks, producing results 138 which helps optimizer 140 improve the defender 134 in real-time. The improved defender 134 will also help the attacker 120 improve the efficiency of the attacks in real time. Embodiments of the present invention therefore produce a fully protected AI model 136 with an efficient defender 134 as well as an efficient attacker 120.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory)

30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for protecting a machine learning model, the method comprising:
   generating a first adversarial example by modifying an original input in accordance with an attack tactic, wherein the machine learning model accurately classifies the original input but does not accurately classify at least the first adversarial example;
   training a defender to protect the machine learning model from the first adversarial example at least in part by updating at least one strategy of the defender based on predictive results from the machine learning model classifying the first adversarial example;
   updating the attack tactic based on the predictive results obtained from the machine learning model classifying the first adversarial example;
   generating a second adversarial example by modifying the original input in accordance with the updated attack tactic, wherein the trained defender does not protect the machine learning model from the second adversarial example;
   training the defender to protect the machine learning model from the second adversarial example at least in part by updating the at least one strategy of the defender based on predictive results obtained from the machine learning model classifying the second adversarial example,
   wherein the defender is separate from the machine learning model and processes input data before the input data reaches the machine learning model, wherein the defender reduces degrees of freedom available to an adversary by applying a feature squeezer to the original input and to each adversarial example, and wherein the feature squeezer implements a defense strategy of squeezing out unnecessary input features from the input data of the machine learning model such that the output of the machine learning model remains unchanged.

2. The method of claim 1, wherein the attack tactic specifies an adversarial perturbation applied to the original input to generate a corresponding adversarial example.

3. The method of claim 1, wherein the defender applies each of a plurality of strategies to the a given adversarial example.

4. The method of claim 3, wherein the plurality of strategies comprise at least a detector and a cleaner.

5. The method of claim 3, wherein at least a first one and a second one of the plurality of strategies are applied to the adversarial example at least one of in series and sequentially.

6. The method of claim 3, wherein at least a first one and a second one of the plurality of strategies are applied to the adversarial example at least one of in parallel and substantially simultaneously.

7. The method of claim 1, wherein the first adversarial example is generated in accordance with a black-box attack, and wherein the second adversarial example is generated in accordance with at least one of a semi-black box attack and a white-box attack.

8. The method of claim 1, wherein the first adversarial example is generated in accordance with at least one of a black-box attack and a semi-black box attack, and wherein the second adversarial example is generated in accordance with a white-box attack.

9. The method of claim 1, wherein the attack tactic specifies which component to target.

10. The method of claim 9, wherein the attack tactic specifies a class of attack with which to target the component.

11. The method of claim 1, wherein the model comprises at least one of an auto-encoder and a text processor.

12. The method of claim 1, wherein the original input comprises at least one of text and a time series.

13. The method of claim 1, wherein the original input comprises structured data.

14. The method of claim 13, wherein the structured data comprises at least one of an array and a vector.

15. The method of claim 1, wherein the at least one strategy is updated in real time based on the predictive results.

16. The method of claim 1, wherein the attack tactic is updated in real time based on the predictive results.

17. The method of claim 1, wherein the updated strategy anticipates a plurality of dynamic tactical attacks.

18. The method of claim 1, wherein a given strategy protects against a given adversarial example by recovering the original input from the given adversarial example.

19. An apparatus for protecting a machine learning model, comprising:
   a memory; and
   at least one processor coupled to the memory, the processor being operative:
      to generate a first adversarial example by modifying an original input in accordance with an attack tactic, wherein the machine learning model accurately classifies the original input but does not accurately classify at least the first adversarial example;
      to train a defender to protect the machine learning model from the first adversarial example at least in part by updating at least one strategy of the defender based on predictive results from the machine learning model classifying the first adversarial example;
      to update the attack tactic based on the predictive results obtained from the machine learning model classifying the first adversarial example;
      to generate a second adversarial example by modifying the original input in accordance with the updated attack tactic, wherein the trained defender does not protect the machine learning model from the second adversarial example; and
      to train the defender to protect the machine learning model from the second adversarial example at least in part by updating the at least one strategy of the defender based on predictive results obtained from the machine learning model classifying the second adversarial example,
   wherein the defender is separate from the machine learning model and processes input data before the input data reaches the machine learning model, wherein the defender reduces degrees of freedom available to an adversary by applying a feature squeezer to the original input and to each adversarial example, and wherein the feature squeezer implements a defense strategy of squeezing out unnecessary input features from the input data of the machine learning model such that the output of the machine learning model remains unchanged.

20. A computer program product comprising a non-transitory machine-readable storage medium having machine-readable program code embodied therewith, said machine-readable program code comprising machine-readable program code configured:
   to generate a first adversarial example by modifying an original input in accordance with an attack tactic, wherein the machine learning model accurately classifies the original input but does not accurately classify at least the first adversarial example;
   to train a defender to protect the machine learning model from the first adversarial example at least in part by updating at least one strategy of the defender based on predictive results from the machine learning model classifying the first adversarial example;
   to update the attack tactic based on the predictive results obtained from the machine learning model classifying the first adversarial example;
   to generate a second adversarial example by modifying the original input in accordance with the updated attack tactic, wherein the trained defender does not protect the machine learning model from the second adversarial example; and
   to train the defender to protect the machine learning model from the second adversarial example at least in part by updating the at least one strategy of the defender based on predictive results obtained from the machine learning model classifying the second adversarial example,
   wherein the defender is separate from the machine learning model and processes input data before the input data reaches the machine learning model, wherein the defender reduces degrees of freedom available to an adversary by applying a feature squeezer to the original input and to each adversarial example, and wherein the feature squeezer implements a defense strategy of squeezing out unnecessary input features from the input data of the machine learning model such that the output of the machine learning model remains unchanged.

* * * * *